United States Patent Office 2,790,814
Patented Apr. 30, 1957

2,790,814

STEROID PRODUCTION

John A. Hogg, Kalamazoo Township, Kalamazoo County, Philip F. Beal III, Portage Township, Kalamazoo County, and Alan H. Nathan and Frank H. Lincoln, Jr., Kalamazoo Township, Kalamazoo County, Mich., assignors to The Upjohn Company, Kalamazoo, Mich., a corporation of Michigan No Drawing. Application April 1, 1953, Serial No. 346,274

27 Claims. (Cl. 260—397.1)

This invention relates to novel steroid compounds and is more particularly concerned with novel 2,21-dialkoxyoxalylprogesterones and their alkali-metal dienolates, the production and use of the novel 2,21-dialkoxyoxalylprogesterones and their alkali-metal dienolates, and especially their use in the preparation of certain $\Delta^{4,17(20)}$-3-keto-21-oic acid alkyl ester steroids.

The first step of the present invention involves diglyoxalation of the starting progesterone. In this step, a $\Delta^4$-3-keto steroid, preferably of the androstane series, having at the 17 position a hydrogen atom and an acetyl group, and having two hydrogen atoms at the 2 position of the steroid nucleus, is reacted with an alkyl diester of oxalic acid in the presence of more than about one molar equivalent of an alkali-metal base condensing agent, to produce a steroid condensation product which includes a novel $\Delta^4$-3,20-diketo-2,21-dialkoxyoxalyl steroid alkali-metal dienolate of the present invention.

The second step of the present invention is halogenation. In this step, the steroid condensation product from Step I is reacted with at least about two molar equivalents of a halogenating agent, preferably a halogen having an atomic weight from 35 to 80, i. e., chlorine or bromine, to produce a steroid halogenation product which includes a $\Delta^4$-3,20-diketo-2,21,21-trihalo-2,21-dialkoxyoxalyl steroid.

The third step of the present invention involves elimination and rearrangement. In this step, the steroid halogenation product from Step II is reacted with an alkalimetal base in the presence of an alkanol to produce a steroid reaction product which includes a $\Delta^{4,17(20)}$-2-halo-3-keto-21-oic acid alkyl ester steroid.

The fourth and final step of the present invention is dehalogenation. In this step, the 2-halogenated steroid carboxylic acid ester produced in Step III is treated with a dehalogenating agent to remove the halogen at the 2 position and produce a $\Delta^{4,17(20)}$-3-keto-21-oic acid alkyl ester steroid.

It is an object of the present invention to provide novel 2,21-dialkoxyoxalylprogesterones and alkali-metal dienolates thereof and a process for their production. Another object of the present invention is the provision of a process for the production and use of the novel 2,21-dialkoxyoxalylprogesterones of the present invention. Another object of the present invention is the provision of a process for the production and use of the novel 2,21-dialkoxyoxalylprogesterones of the present invention in the production of $\Delta^{4,17(20)}$-3-keto-21-oic acid alkyl ester steroids. Other objects of the present invention will be apparent to one skilled in the art to which this invention pertains.

A preferred embodiment of the process of the present invention and the novel compounds of the present invention produced and utilized therein may be representatively illustrated as follows:

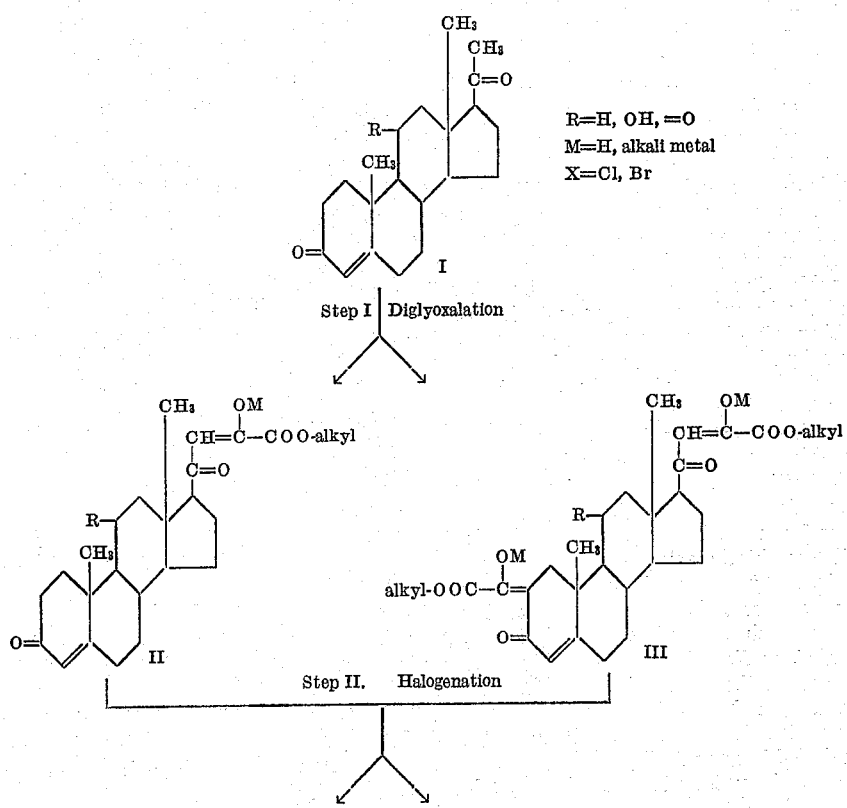

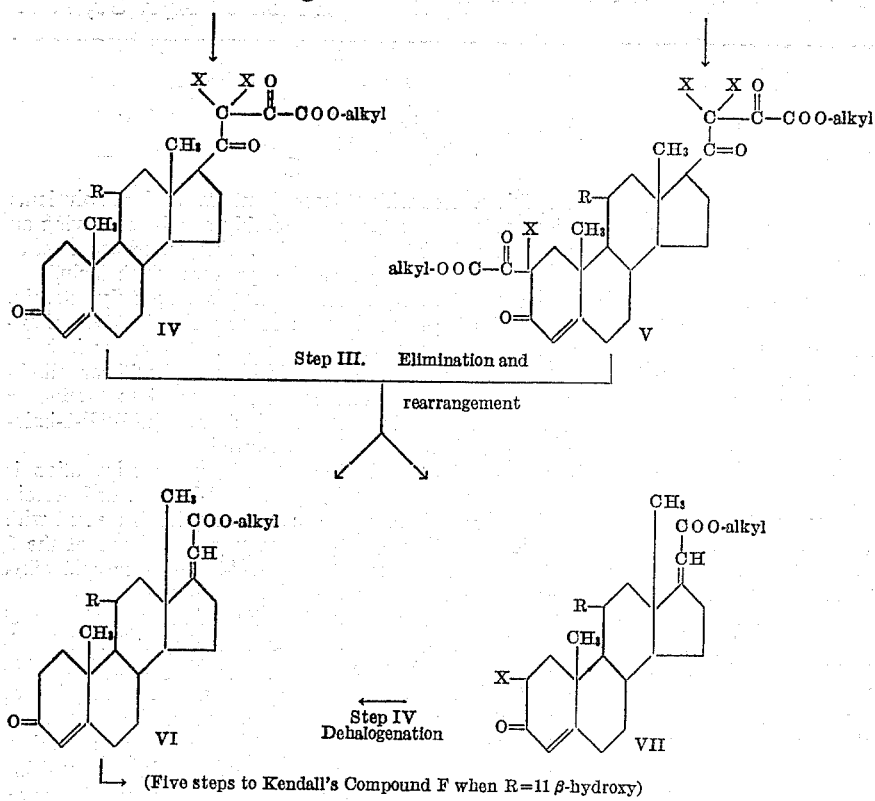

↳ (Five steps to Kendall's Compound F when R=11 β-hydroxy)

The novel compounds of the present invention may be represented by Formula III and especially preferred are those compounds represented by Formula III wherein the alkyl group is lower-alkyl.

The compounds represented by Formula VI and by Formula VII may be named as 21-carbonyloxy-4,17(20)-pregnadiene-3-ones or as 3-keto-4,17(20)-pregnadiene-21-oic acid alkyl esters.

The complete process of the present invention produces in sequence novel 2,21-dialkoxyoxalyl steroids (III), 2,21-dialkoxyoxalyl-2,21,21-trihalo steroids (V), $\Delta^{4,17(20)}$-2-halo-3-keto-21-oic acid alkyl ester steroids (VII), and $\Delta^{4,17(20)}$-3-keto-21-oic acid alkyl ester steroids (VI). These compounds are valuable intermediates in the production of known and new steroids and many of these steroids are readily converted to physiologically active hormones. For example, treatment of a 3,11-diketo-4,17(20)-pregnadiene-21-oic acid alkyl ester (VI) (after protecting the 3-ketone with a ketal group, e. g., an ethylene glycol ketal group, as by reaction with ethylene glycol in the presence of an acid catalyst), with a reducing agent capable of reducing both the carboxylic acid ester group and the ketonic oxygen group to hydroxy groups, e. g., lithium aluminum hydride or other alkali-metal aluminum hydride, and subsequent hydrolysis of the resulting reaction product with mineral acid, is productive of 11β,21 - dihydroxy - 4,17(20) - pregnadiene - 3 - one. This compound or a 21-acyl ester thereof is readily convertible to 11β,17α,21-trihydroxy-4-pregnene-3,20-dione (Kendall's Compound F) by reaction with osmium tetroxide to produce 11β,17α,20,21-tetrahydroxy-4-pregnene-3-one 17,20-osmate ester, which is then oxidized as with perchloric acid, salts thereof, potassium chlorate, hydrogen peroxide, dialkyl peroxides, organic peracids such as peracetic or perbenzoic acid, or the like, in a solvent such as an ether or an alcohol, e. g., tertiary butyl alcohol or diethyl ether, according to procedure already known in the art [Prins and Reichstein, Helv. Chim. Acta, 25, 300 (1942); Ruzicka and Mueller, Helv. Chim. Acta, 22, 755 (1939)]. Using 3-keto-4,17(20)-pregnadiene-21-oic acid alkyl esters (VI) as starting material in the above-described reactions produces 17α,21-dihydroxy-4-pregnene-3,20-dione (Reichstein's Compound S) which can be converted by oxygenation with Mucorales fungi to 11α,17α,21-trihydroxy-4-pregnene-3-one which, upon 21-acylation and 11-oxidation, is converted to cortisone, all as disclosed in U. S. Patent 2,602,769, issued July 8, 1952, to Murray and Peterson.

Similarly, starting with a 3-keto-11-hydroxy-4,17(20)-pregnadiene-21-oic acid alkyl ester (VI) and proceeding through the same reactions described above for the production of Compound F, but oxidizing the 11-hydroxy group to an 11-keto group, e. g., as with chromic acid prior to the osmium tetroxide hydroxylation (and the subsequent oxidation), is productive of 17α,21-dihydroxy-4-pregnene-3,11,20-trione (Kendall's Compound E).

The prior art [Ruzicka and Plattner, Helv. Chim. Acta, 21, 1717 (1938)] teaches that a $\Delta^4$-3-keto steroid (cholestenone) can be glyoxalated in good yield in the 2 position. Later, Bockmuhl et al., U. S. Patent 2,265,417, issued December 9, 1951, found that a 20-keto steroid (pregnenolone) could be glyoxalated in the 21 position. It was recently found that, when one molar equivalent or less of base per mole of $\Delta^4$-3,20-diketo steroid is used, the reaction is selective and the reaction product is a $\Delta^4$-3,20-diketo-21-alkoxyoxalyl steroid. We have found, however, that when about equal molar equivalents of reactants are employed in the reaction, a yield close to quantitative is seldom attained. Moreover, if less than one molar equivalent of one of the reactants, in this case the base, is employed, the yield based on the starting steroid is reduced accordingly. We have now found that the use of alkali-metal base as condensing agent in excess of one molar equivalent per mole of starting steroid in the glyoxalation of a $\Delta^4$-3,20-diketo steroid results in the production of a high yield of steroid condensation product which includes a $\Delta^4$-3,20-diketo-2,21-dialkoxyoxalyl steroid (e. g., III), the yield of 2,21-dialkoxyoxalyl steroid, i. e., diglyoxalated steroid, usually increasing percentagewise with an increase in the amount of alkali-metal base employed in excess of one molar equivalent, until, when greater than about 2.5 molar equivalents of alkali-metal base are employed per mole of starting steroid, almost no monoglyoxalated steroid is ordinarily obtained.

We have found, when following the procedure of the present invention, that the novel 2,21-diglyoxalated steroids can be prepared in high yield, calculated on the starting steroid, by using an excess of the alkali-metal base, thus assuring optimum inter-action of the starting materials. Since the ultimately desired product (VI), a $\Delta^{4,17(20)}$-3-keto-21-carboxylic acid alkyl ester steroid, is the same regardless of the extent to which the starting steroid is glyoxalated at the 2 position, the glyoxalation at the 2 position, which at first appeared only as a disadvantageous result of the use of a substantial excess of alkali-metal base condensing agent in the selective 21-glyoxalation procedure, has now been used by us not only to produce novel and useful 2,21-diglyoxalated progesterones but to enhance the total yield of glyoxalated product, thus reducing the amount of unreacted starting steroid to a minimum.

Depending upon the amount of alkali-metal base condensing agent employed per mole of starting steroid, the resulting product may be essentially monoglyoxalated with a trace of diglyoxalated product, a mixture of mono and diglyoxalated products, essentially all diglyoxalated product with a trace of monoglyoxalated product, or all diglyoxalated product. Since the composition of the intermediate reaction products may vary over such a wide range and still be used to produce the same ultimate product (e. g., VI), the series of reactions of the present invention for the production and use of 2,21-dialkoxyoxalylprogesterones lends itself to being performed consecutively with or without isolation of the intermediately produced products. We have found that, when the process of the present invention is performed without isolating the intermediately produced products, the yield of ultimate product is markedly increased, sometimes giving 65 percent or more of pure $\Delta^{4,17(20)}$-3-keto-21-oic acid alkyl ester steroid (e. g., VI) based on the starting steroid, or an average yield of ninety percent for each of the four steps. It is of course to be understood that isolations can be effected, if desired, at any point in the process, and the reaction further employed in the remaining steps of the process or put to any other desired use.

As previously stated, the novel compounds of the present invention of particular interest are those of Formula III wherein the alkyl group is lower-alkyl, e. g., methyl, ethyl, propyl, isopropyl, butyl, isobutyl, amyl, hexyl, heptyl, octyl, or the like, especially methyl or ethyl. Compounds of particular interest are those wherein R is a β-hydroxy group or a keto group (=O), especially since these compounds can be readily converted to the valuable cortisone (Kendall's Compound E) and hydrocortisone (Kendall's Compound F) as shown hereinbefore.

The starting compounds of the present invention are $\Delta^4$-3-keto steroids having at the 17 position a hydrogen atom and an acetyl group

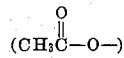

side chain, and having two hydrogen atoms at the 2 position of the steroid nucleus, and preferred among these are progesterones, i. e., substituted and unsubstituted $\Delta^4$-3,20-diketopregnenes, especially progesterone, 11α-hydroxyprogesterone [Peterson and Murray, J. Am. Chem. Soc., 74, 1871 (1952)], 11β-hydroxyprogesterone, and 11-ketoprogesterone. The normethyl analogues of these and other steroids meeting the above requirements may also be employed as suitable starting materials in the process.

STEP I. DIGLYOXALATION

In carrying out the first step of the present invention, a $\Delta^4$-3-keto steroid, preferably an androstane steroid, having at the 17 position a hydrogen atom and an acetyl group, and having two hydrogen atoms at the 2 position of the steroid nucleus, is mixed with at least about one molar equivalent each of an alkyl diester of oxalic acid and an alkali-metal base condensing agent to produce a reaction product which includes a $\Delta^4$-3,20-diketo-2,21-dialkoxyoxalyl alkali-metal dienolate steroid. This step is usually performed in a solvent such as, for example, benzene, methanol, ethanol, tertiary butyl alcohol, tertrahydrofuran, ether, Skellysolve B hexane hydrocarbons, or mixtures of these or other essentially non-reactive solvents. Benzene, with or without small percentages of added alkanol, and tertiary butyl alcohol, are usually preferred solvents, and of these, tertiary butyl alcohol is usually preferred if all of the four steps of the present invention are to be carried out without any isolation.

Room temperature is the preferred reaction temperature for the first step of the present invention, although temperatures between about zero degrees centigrade and the boiling point of the reaction mixture can be used. Reaction times may vary from less than one-half hour to several days, depending upon the solvent, the reaction temperature, the starting reactants, the amount of moisture present in the reaction, and the molar ratio of reactants employed. When sodium methoxide or ethoxide and methyl or ethyl oxalate are employed, the reaction is usually essentially complete in about four hours or less. The reaction is preferably carried out in the absence of any significant amounts of water in any form, and since the reaction appears to be somewhat reversible in the presence of an alkanol, large amounts of added methyl or ethyl alcohol, which sometimes tend to reduce the yield of desired product, are usually avoided.

Alkali-metal base condensation agents which may be used include the preferred alkali-metal alkoxides, e. g., sodium methoxide, sodium ethoxide, potassium tertiary butoxide, lithium methoxide, and the like, the alkali metals, the alkali-metal hydrides and the alkyl alkali metals, e. g., sodium amide, triphenyl methyl sodium, and the like. Of these, sodium methoxide and sodium ethoxide are preferred for their convenience and consistently satisfactory results. The alkali-metal alkoxide may be used solvent-free, dissolved or suspended in a non-reactive solvent, or in situ in the alkanol in which said alkali-metal alkoxide was prepared. When potassium is used, it is usually used as the solution formed by its reaction with tertiary butyl alcohol according to procedure well known in the art.

When close to about one molar equivalent of alkali-metal base condensing agent is employed per mole of starting steroid, the above-described reaction usually produces predominantly the monogyloxalated product (II), whereas when closer to two molar equivalents of base are employed, the mixture is of somewhat more equal proportions of the mono and diglyoxalated products, II and III. When substantially greater than about two molar equivalents of base are employed, the product is usually essentially all diglyoxalated product (III). In some cases, a portion of the monoglyoxalated product tends to precipitate from the reaction mixture, lessening completeness of the diglyoxalation to a certain but unimportant extent. The presence of substantially greater than about two molar equivalents of a dialkyl ester of oxalic acid in the reaction mixture promotes the production of optimum yields of the desired reaction product, regardless of the selected proportion of base to be employed. The production of all diglyoxalated product requires at least about two molar equivalents of an alkyl diester of oxalic acid as well as at least about two molar equivalents of base condensing agent, and therefore, when it is desired to isolate the diglyoxalated product, such proportions of reactants are preferred. Of the alkyl diesters of oxalic acid, methyl oxalate and ethyl oxalate are preferred.

The thus-produced glyoxalated product may then be isolated by precipitation or by other procedure or used directly without isolation in the next step of the process. Usually it is not desirable to isolate or purify the thus-glyoxalated product unless it is wished to obtain the 2,21-dialkoxyoxalyl steroid as an isolated product, since the yield of final 3-keto-4,17(20)-pregnadiene-21-oic acid alkyl ester (VI) is usually somewhat reduced thereby, but isolation for purification or other purposes is conveniently achieved if desired by the addition to the mixture of a solvent in which the alkali-metal enolate is insoluble or by the addition of aqueous acid, if the free enol is the desired product, and then isolating the free enol by conventional procedure.

STEP II. HALOGENATION

The second step of the process of the present invention involves reaction of the steroid condensation product from Step I with at least about two molar equivalents of a halogen having an atomic weight from 35 to 80, inclusive, i. e., chlorine or bromine, but not substantially exceeding that amount required to maintain free halogen in the reaction mixture, to produce a steroid halogenation product which includes a $\Delta^4$-3,20-diketo-2,21,21-trihalo-2,21-dialkoxyoxalyl steroid (e. g., V). This step may be performed directly on the crude or unisolated total reaction product from the first step of the present invention. Although this halogenation may be performed under somewhat acidic or essentially neutral conditions, the reaction is preferably conducted under slightly basic conditions.

If more than about two molar equivalents of alkali-metal base condensing agent per mole of steroid are used in the condensation step, and if the 2,21-dialkoxyoxalyl steroid is not isolated in Step I, then the total reaction product at this point will include the excess alkali-metal base condensing agent. However, the presence of this excess base condensing agent appears to be somewhat disadvantageous in the halogenation Step II. Therefore, if this total reaction product is used as starting material for the halogenation step, the excess base condensing agent is preferably decomposed by the addition of the number of molar equivalents of aliphatic carboxylic acid, preferably acetic acid, theoretically required to decompose any excess alkali-metal base condensing agent remaining in the reaction mixture. Since it may sometimes be difficult to determine how much excess alkali-metal base condensing agent is present in the crude reaction mixture from Step I, a preferred procedure comprises the addition of an aliphatic carboxylic acid to the mixture in an amount chemically equivalent to the alkali-metal base condensing agent employed in the previous Step I. This preferred procedure results in a weakly basic medium due to the formation of an alkali-metal salt of the acid used for the decomposition.

The halogenation step, under such conditions of operation, is performed on the free enol form of the condensation product. Representative acids which may be used for this purpose include formic, acetic, propionic, dimethylacetic, octanoic, or like acid, with acetic acid being preferred.

When the starting material for the halogenation step is the total steroid reaction product from the condensation Step I, there may be present therein a mixture of $\Delta^4$-3,20-diketo-21-alkoxyoxalyl alkali-metal enolate steroid (e. g., II) and $\Delta^4$-3,20-diketo-2,21-dialkoxyoxalyl alkali-metal dienolate steroid (e. g., III) or essentially all dienolate steroid (e. g., III). If the halogenation reaction is performed in the presence of added aliphatic carboxylic acid, these alkali-metal enolates are converted to the free enols and, as previously stated, the halogenation is performed on the free enols.

This halogenation step results in the production of about one mole of hydrogen halide per mole of starting steroid, which hydrogen halide will remain in the reaction mixture if no base is present to react therewith. The presence of this hydrogen halide in the reaction mixture appears to be somewhat undesirable and it is therefore preferably decomposed in situ as it is formed by a chemical equivalent or greater amount of a suitable base present in the reaction mixture during the halogenation step. Suitable bases are those bases which are of sufficient strength to decompose the hydrogen halide but preferably not strong enough to react to any appreciable extent with the product of the halogenation, such as, for example, alkali-metal salts of aliphatic carboxylic acids, potassium octanoate, amines, urea, aluminum hydroxide, triphenyl amine, and the like. The alkali-metal salts of aliphatic carboxylic acids appear to be most desirable and, of these, sodium acetate and potassium acetate are preferred. As was previously stated, any excess alkali-metal base condensing agent remaining after the condensation Step I appears to be detrimental in the halogenation step, so this basic condensing agent is therefore preferably not employed for the decomposition of the hydrogen halide. However, the salt resulting from decomposition of excess alkali-metal base condensing agent with an aliphatic carboxylic acid is of sufficient basicity to react with the hydrogen halide and is therefore satisfactory for this purpose. If no excess alkali-metal base condensing agent is employed in the condensation step, or if the amount employed is insufficient to provide, upon reaction with the aliphatic carboxylic acid, a chemical equivalent amount of base to react with the hydrogen halide formed, then more base of the type stated above should be added to the reaction mixture prior to the halogenation. The minimum number of molar equivalents added should preferably total at least one when added to the number of molar equivalents of aliphatic acid added at the end of condensation Step I to decompose any excess alkali-metal base condensing agent. This minimum amount will ensure that all of the hydrogen halide is decomposed as it is formed during the halogenation Step II.

The amount of chlorine or bromine which need be added to completely react with the glyoxalated material to produce compounds of Formulae IV and V varies somewhat between about two and three molar equivalents per mole of starting glyoxalated steroid, depending upon the exact composition of the product of the condensation Step I. When bromine is the halogenating agent, the exact amount required can be readily determined by observing the reaction mixture for the persistent color of free bromine. Moreover, since the starting material is usually colored and the reaction mixture usually becomes colorless just prior to the end point of the halogenation, the exact amount of chlorine or bromine necessary for the reaction of any particular starting materials in this step is readily determined without the necessity of experimentation. Alternatively, a free chlorine or bromine indicator may be used to determine the end point.

Solvents commonly employed for halogenations may be used in the halogenation step, e. g., acetic acid, buffered with potassium acetate, methanol, chloroform, and the like. When all of the steps of the present process are carried out without the isolation of the intermediately produced compounds, tertiary butyl alcohol is the preferred solvent since each of the four steps of the present process may advantageously be carried out in this solvent, although other solvents may also serve for all four steps as will be immediately apparent to one skilled in the art.

Since the halogenation is essentially instantaneous, the reaction time necessary is usually only that time necessary to add the bromine or chlorine at a reasonable rate. The halogenation is preferably carried out at below room temperature, e. g., between about minus five and plus twenty degrees centigrade, although temperatures as low as about minus thirty degrees centigrade and as high as about seventy degrees centigrade can also be employed. The thus-halogenated product is usually used without isolation or purification in the next step of the process. The halogenated product may, however, be isolated by addition of a large volume of water to the reaction mixture or, if the reaction solvent is water immiscible, by distillation of the reaction solvent from the mixture and then washing the residue with water. In most instances bromine is the preferred halogenating agent because of the consistently high yields of product obtained and the ease with which bromine can be utilized.

Although chlorine and bromine have been found to perform exceedingly well as halogenating agents in the method of the present invention and are therefore preferred, other halogenating agents may be employed to produce the 2,21,21-trihalo steroid of the present invention. Halogenating agents such as, for example, iodine, alkyl hypohalites, e. g., tertiary butyl hypochlorite, ethyl hypochlorite, hypohalous acids, hypochlorous or hypobromous acid, and in situ halogen producing agents such as N-bromosuccinimide or N-bromoacetamide in the presence of acid, may also be employed. However, it is to be understood that the use of some of these agents may result to at least some extent in accompanying oxidation and other side reactions, with corresponding reduction in yields of desired product, and the use of chlorine or bromine is therefore preferred.

STEP III. ELIMINATION AND REARRANGEMENT

Step III of the present invention, the production of $\Delta^{4,17(20)}$-3-keto-21-oic acid alkyl ester steroids (VI and VII), involves the reaction, in the presence of an alkanol, of the halogenated steroid material from Step II with a base, e. g., an alkali-metal base, which is preferably an alkali-metal alkoxide, of sufficient strength to convert the halogenated steroid product to a $\Delta^{4,17(20)}$-3-keto-21-oic acid alkyl ester steroid. This step is conveniently accomplished, especially when tertiary butyl alcohol is used as the reaction solvent, by the addition of a large volume of an alkanol and the desired amount of the selected base at about room temperature or higher.

Bases which react readily with the halogenated steroid product, and which are therefore preferred in Step III, are the alkali-metal alkoxides such as, for example, sodium methoxide, sodium ethoxide, potassium isopropoxide, potassium tertiary butoxide, and the alkali-metal hydroxides such as, for example, potassium hydroxide, sodium hydroxide, or lithium hydroxide. Still other bases which may be used include trimethyl benzyl ammonium hydroxide, calcium carbonate, silver oxide, and the like.

The amount of base and alkanol theoretically required is at least two molar equivalents per mole of halogenated steroid, but usually a much larger amount of an alkanol is used and at least a slightly larger amount of base is employed. If the starting reaction mixture is the crude, unisolated halogenation product, and if the hydrogen halide is decomposed with an alkali-metal salt of an aliphatic carboxylic acid, there will be present in the starting mixture of Step III an aliphatic carboxylic acid. Since this acid will react with base before the halogenated steroid starting material, an additional amount of base sufficient to react with this residual aliphatic carboxylic acid, when present, should be added in addition to the theoretical minimum of two molar equivalents.

The preferred operating conditions comprise the addition of a large volume of an alkanol, such as, for example, ethanol, propanol, isopropanol, butanol, preferably a primary lower-aliphatic alkanol, especially methanol or ethanol, and at least two molar equivalents of a base. Preferably an alkali-metal base, of which sodium methoxide or sodium ethoxide are especially desirable, is employed. The resulting mixture is then maintained at about room temperature or above for at least several minutes, sometimes an hour or even longer, depending upon the degree of reactivity of the base and the alkanol with the starting halogenated steroid.

While it was previously stated that bases such as, for example, potassium octanoate, amines, and the like, are suitable bases for decomposition of hydrogen halide formed in the halogenation Step II since they do not react to any appreciable extent with the halogenated steroid product of Step II, some of these bases, under certain conditions, may be caused to react with the halogenated product of Step II. For example, if in Step II the reaction time is of sufficient duration or if the reaction temperature is sufficiently high, such weaker bases may also be used for the production of a $\Delta^{4,17(20)}$-3-keto-21-oic acid alkyl ester steroid. Since the halogenation in Step II is complete in a few minutes, the fact that these bases may slowly react with the halogenation product is inconsequential. However, the weaker bases can, if desired, be reacted with the halogenation product of Step II by employing a reaction period longer than required to add the halogen to the starting mixture for Step II to ensure a satisfactory degree of reaction, including both halogenation and the rearrangement and elimination step. When operating in this manner, the two Steps II and III become substantially one. This, however, is not the preferred manner of operation.

Isolation of the reaction product, as in the previous steps, may be carried out by the addition of water to the mixture or by other conventional means, but in the preferred procedure the resulting reaction material is used in the final step of the process without isolation or purification.

STEP IV. DEHALOGENATION AT POSITION 2 OF THE STEROID NUCLEUS

The last step of the process of the present invention, i. e., the reaction of the 2-halogenated steroid product of Step III with a dehalogenating agent, converts the 2-halogenated portion of the $\Delta^{4,17(20)}$-3-keto-21-oic acid alkyl ester steroid material (e. g., VII) produced in Step III into a non-halogenated compound identical to non-halogenated $\Delta^{4,17(20)}$-3-keto-21-acid alkyl ester steroid (e. g., VI) produced in Step III, by removal of halogen from the 2 position of the reaction product. The number of molar equivalents each of zinc and acetic acid, for best results, should be at least equal to the number of molar equivalents of halogen employed in Step II exceeding two. Thus, although the composition of the steroid reaction product produced in Step III may vary widely between material containing small amounts of 2-halogenated product and material consisting essentially or entirely of $\Delta^{4,17(20)}$-2-halo-3-keto-21-oic acid alkyl ester steroid, the resulting product after treatment with a dehalogenating agent, e. g., zinc and acetic acid, is the same (e. g., VI).

Although the number of molar equivalents of zinc and acetic acid or equivalent dehalogenating agent used in Step IV may theoretically be equal to the number of molar equivalents of halogen exceeding two employed in Step II, calculated on the original starting steroid, since this amount will be about equal to the number of molar equivalents of 2-halogenated steroid present in the mixture, a large molar excess of dehalogenating agent is usually and preferably employed. A substantial molar excess of zinc and acetic acid are usually added to an organic solvent solution of the halogenated steroid product of Step III and the resulting slurry stirred, preferably at room temperature or higher temperature, for several minutes to several hours. The resulting steroid material may be isolated by filtering the precipitated inorganic salts and then precipitating the steroid material from the filtrate by distilling the solvent therefrom or by adding a large volume of water to the resulting filtrate. The thus-produced $\Delta^{4,17(20)}$-3-keto-21-oic acid alkyl ester steroid (e. g., VI) may then be purified in conventional manner, such as, for example, by fractional crystallization or chromatography. Product of high purity is readily obtained by chromatographing the reaction product over Florisil magnesium silicate using as little as four grams of Florisil per gram of steroid and using solvents as exemplified in the experimental examples given hereinafter.

Other representative dehalogenating agents which can be used in Step IV include sodium iodide in acetone or an alkanol, chromyl chloride, deactivated Raney nickel, and the like. Usually, to obtain optimum yields of dehalogenated product, a large molar excess of dehalogenating agent is employed and the reaction is conducted at about room temperature although somewhat higher and lower temperatures frequently produce very satisfactory results.

The following examples are illustrative of the process and products of the present invention but are not to be construed as limiting.

*Example 1.—2,21-diethoxyoxalyl-11-ketoprogesterone and sodium dienolate thereof (III)*

Nineteen milliliters (0.136 mole) of ethyl oxalate and 21.2 milliliters (0.047 mole) of a 2.2 Normal methanolic solution of sodium methoxide were added to a solution of 6.9 grams (0.021 mole) of 11-ketoprogesterone in 100 milliliters of anhydrous tertiary butyl alcohol at about fifty degrees centigrade. The mixture was allowed to stand at room temperature for three hours, whereafter the precipitated sodium dienolate of 2,21-diethoxyoxalyl-11-ketoprogesterone was filtered, washed with ether and then dissolved in water. The aqueous solution was acidified with dilute hydrochloric acid and the thus-precipitated 2,21-diethoxyoxalyl-11-ketoprogesterone was filtered therefrom and then dried to yield 10.2 grams, a yield of 92 percent of the theoretical, of 2,21-diethoxyoxalyl-11-ketoprogesterone in the form of a yellow amorphous powder which exhibited a reddish color in an alcoholic ferric chloride solution and had the analysis given below.

*Analysis.*—Calculated for $C_{29}H_{36}O_9$: C, 65.89; H, 6.87. Found: C, 66.25; H, 6.67.

In the same manner as illustrated in the above example, other 2,21-dialkoxyoxalyl-11-ketoprogesterones and their sodium enolates are prepared by the substitution of the selected alkyl oxalate for the diethyl oxalate used in the above example. Compounds thus-prepared include those wherein the alkoxy group is lower-alkoxy, e. g., methoxy, propoxy, butoxy, amyloxy, hexyloxy, heptyloxy, octyloxy, and the like.

*Example 2.—2,21-diethoxyoxalyl-11α-hydroxyprogesterone and sodium dienolate thereof (III)*

In the same manner as described in Example 1, 2,21-diethoxyoxalyl-11α-hydroxyprogesterone and the sodium dienolate thereof are prepared by the substitution of 11α-hydroxyprogesterone [Peterson and Murray, J. Am. Chem. Soc., 74, 2381 (1952)] for the 11-ketoprogesterone used in the therein-described reaction as the starting steroid.

*Example 3.—2,21-diethoxyoxalyl-11β-hydroxyprogesterone and sodium dienolate thereof*

In the same manner as described in Example 1, 2,21-diethoxyoxalyl-11β-hydroxyprogesterone and the sodium dienolate thereof are prepared by the substitution of 11β-hydroxyprogesterone for the 11-ketoprogesterone used in the therein-described reaction as the starting steroid.

*Example 4.—2,21-diethoxyoxalylprogesterone and sodium dienolate thereof*

In the same manner as described in Example 1, 2,21-diethoxyoxalylprogesterone and the sodium dienolate thereof are prepared by the substitution of progesterone for the 11-ketoprogesterone used in the therein-described reaction as the starting steroid.

Similarly, the 2,21-di-(lower-alkoxyoxalyl) homologues of the compounds of Examples 1 through 4 are prepared by substituting the selected lower-alkyl diester of oxalic acid, wherein the alkyl groups are methyl, propyl, butyl, isobutyl, amyl, hexyl, heptyl, octyl, or the like, for the diethyl oxalate used in the therein-described reactions.

The potassium enolates of any of the above-named 2,21-diethoxyoxalyl compounds or lower-alkoxy homologues thereof are prepared by the substitution of potassium tertiary butoxide for the sodium methoxide in the above-described reactions.

*Example 5.—2-bromo-3,11-diketo-4,17(20)-pregnadiene-21-oic acid methyl ester (VII) (from isolated 2,21-diethoxyoxalyl-11-ketoprogesterone)*

A solution of eight grams (0.015 mole) of the 2,21-diethoxyoxalyl-11-ketoprogesterone obtained according to the method described in Example 1 and 5.9 grams (0.060 mole) of anhydrous potassium acetate in 140 milliliters of methanol was cooled to zero degrees centigrade in an ice bath and a solution of 7.4 grams (0.046 mole) of bromine in 74 milliliters of methanol was then added dropwise thereto over a period of about one-half hour, thus producing 2,21,21-tribromo-2,21-diethoxyoxalyl-11-ketoprogesterone (V). To the resulting mixture was then added about fifty milligrams of phenol and 67 milliliters (0.100 mole) of a 1.5 Normal methanolic solution of sodium methoxide, whereafter the mixture was heated for five minutes on a steam bath followed by the addition of the cooled solution to water. A flocculent white precipitate of 2-bromo-11-keto-4,17(20)-pregnadiene-21-oic acid methyl ester formed and, after being thoroughly washed with water and dried in a vacuum desiccator, weighed 6.77 grams and melted at 74 to 94 degrees centigrade. A portion of this impure product weighing 1.50 grams was chromatographed over 150 grams of Florisil magnesium silicate. The column was developed with 200-milliliter portions of solvents of the following composition and order: one of benzene, ten of Skellysolve B hexane hydrocarbons plus five percent acetone, and ten of Skellysolve B plus 7.5 percent acetone. The second, third and fourth portions of Skellysolve B plus 7.5 percent acetone eluates were combined and the solvent was distilled therefrom leaving 382 milligrams of product melting at 130 to 154 degrees centigrade. Recrystallization of these crystals from methanol gave analytically pure 2-bromo-3,11-diketo-4,17(20)-pregnadiene-21-oic acid methyl ester as transparent prisms whose melting point varied between 155 to 160 degrees centigrade and 160 to 162 degrees centigrade, depending upon the rate of heating.

*Analysis.*—Calculated for $C_{22}H_{27}BrO_4$: Br, 18.36. Found: Br, 18.46.

In a similar manner, 2-bromo-3,11-diketo-4,17(20)-pregnadiene-21-oic acid methyl ester is prepared from other 2,21,21-tribromo-2,21-dialkoxyoxalyl-11-ketoprogesterones wherein the alkyl group of the alkoxy radical is ethyl, propyl, butyl, amyl, hexyl, heptyl, octyl, or the like, by the replacement of the 2,21,21-tribromo-2,21-diethoxyoxalyl-11-ketoprogesterone in the above-described reaction by the selected 2,21,21-tribromo-2,21-dialkoxyoxalyl-11-ketoprogesterone.

Similarly, other 2-bromo-3-keto-4,17(20)-pregnadiene-21-oic acid alkyl esters, especially lower-alkyl, having at the 11 position a hydrogen, an α-hydroxy group, a β-hydroxy group, or a ketonic oxygen, are prepared by the reaction of the selected 2,21,21-tribromo-2,21-dialkoxyoxalyl-11-oxygenated progesterone with an alkali-metal alkoxide in an alkanol wherein the alkyl group of the alkali-metal alkoxide and alkanol is methyl, ethyl, propyl, butyl, amyl, hexyl, heptyl, octyl, or the like. Compounds thus-produced include 2-bromo-3-keto-11α-hydroxy-4,17(20)-pregnadiene-21-oic acid methyl ester, 2-bromo-3-keto-11β-hydroxy-4,17(20)-pregnadiene-21-oic acid methyl ester, 2-bromo-3-keto-4,17(20)-pregnadiene-21-oic acid methyl ester, the corresponding ethyl esters of the above-named compounds as well as other lower-alkyl esters.

*Example 6.—2-chloro-3,11-diketo-4,17(20)-pregnadiene-21-oic acid methyl ester (VII)*

Following the procedure described in Example 5, but substituting an equimolar amount of chlorine for the bromine used therein, 2,21-diethoxyoxalyl-11-ketoprogesterone is converted to 2,21,21-trichloro-2,21-diethoxyoxalyl-11-ketoprogesterone (V). Reacting the thus-produced 2,21,21-trichloro-2,21-diethoxyoxalyl - 11 - ketoprogesterone with sodium methoxide in the same manner as described in Example 5 is productive of 2-chloro-3,11-diketo-4,17(20)-pregnadiene-21-oic acid methyl ester. This compound is readily converted by reaction with an excess of zinc and acetic acid to 3,11-diketo-4,17(20)-pregnadiene-21-oic acid methyl ester.

The 2-chloro analogues of any of the compounds named in Example 5 are prepared by substituting chlorine for the bromine used in the halogenation step of that example.

*Example 7.*—*3,11 - diketo - 4,17(20)-pregnadiene-21-oic acid methyl ester (VI) (from isolated 2-bromo-3,11-diketo-4,17(20)-pregnadiene-21-oic acid methyl ester)*

To a solution of 2-bromo-3,11-diketo-4,17(20)-pregnadiene-21-oic acid methyl ester in benzene, methanol, and acetic acid is added a large molar excess of zinc dust and the whole is then stirred for several hours. The mixture is then filtered, the filtrate washed with water, a saturated sodium bicarbonate solution, and then water, and the filtrate then dried. Upon distillation of the dried solution to dryness there is obtained a practically quantitative yield of 3,11-diketo-4,17(20)-pregnadiene-21-oic acid methyl ester.

Similarly, 3 - keto-11α-hydroxy-4,17(20)-pregnadiene-21-oic acid methyl ester, 3-keto-4,17(20)-pregnadiene-21-oic acid methyl ester, and 3-keto-11β-hydroxy-4,17-(20)-pregnadiene-21-oic acid methyl ester, and the like are prepared from their corresponding 2-bromo compound by the reaction of said compound with zinc in the presence of acetic acid.

*Example 8.*—*3,11 - diketo - 4,17(20)-pregnadiene-21-oic acid methyl ester (from 11-ketoprogesterone without the isolation of 2,21 - diethoxyoxalyl - 11 - ketoprogesterone)*

To a solution of 8.2 grams (0.025 mole) of 11-ketoprogesterone in 125 milliliters of anhydrous tertiary butyl alcohol was added with stirring 13.6 milliliters (0.100 mole) of ethyl oxalate and twenty milliliters (0.062 mole) of 3.15 Normal solution of sodium methoxide in methanol at about fifty degrees centigrade, whereupon a heavy precipitate began to appear immediately. The mixture was stirred for twenty hours, with the exclusion of moisture, whereafter a solution of 3.06 grams of sodium acetate and 3.53 milliliters of glacial acetic acid in 200 milliliters of methanol was added thereto. The precipitate redissolved and the resulting solution turned dark brown.

The solution was cooled to about five degrees centigrade with an ice bath and a solution of 10.8 grams (0.0675 mole) of bromine in 108 milliliters of methanol was added during the next half hour. The amount of bromine to be added was determined by the color of the reaction mixture which progressively lightened during the course of the bromine addition until the solution was colorless. When the bromine color appeared to persist, no further bromine was added.

To this solution was added 45 milliliters (0.142 mole) of a 3.15 Normal methanolic solution of sodium methoxide whereupon the mixture turned deep orange and then lightened to a cloudy amber solution. The solution was stirred for five hours at room temperature and then poured with stirring into 1500 milliliters of water containing about fifteen grams of sodium chloride. The resulting precipitate was filtered and dried and found to weigh 9.58 grams. A 2.34-gram (24.4 percent) portion of this material was dissolved in a mixture of fifty milliliters of benzene, 25 milliliters of methanol and five milliliters of acetic acid, and 2.4 grams of zinc dust was then added to the solution and the whole was stirred vigorously for four hours. The solid material was filtered and washed with warm benzene, the benzene added to the filtrate, and the whole then washed successively with sixty milliliters of water, sixty milliliters of a saturated sodium bicarbonate solution, and 25 milliliters of water. The benzene solution was then dried and the solvent distilled therefrom to leave 1.65 grams of crystals melting at 165 to 175 degrees centigrade. These crystals were recrystallized from a mixture of fifteen milliliters of hot ethyl acetate and seven milliliters of Skellysolve B hexane hydrocarbons to yield a first crop of 1.112 grams of 3,11-diketo-4,17(20)-pregnadiene-21-oic acid methyl ester melting at 205 to 209 degrees centigrade and having a $[\alpha]_D^{23}$ of plus 165 degrees. This represents a 51.15 percent yield of the amount theoretically obtainable, based on the starting 11-ketoprogesterone. Analytically pure material melts at 218 to 220 degrees centigrade and has an $[\alpha]_D^{23}$ of plus 186 degrees.

*Example 9.*—*3,11 - diketo - 4,17(20)-pregnadiene-21-oic acid methyl ester (without isolation of 2,21-diethoxyoxalyl-11-ketoprogesterone)*

Following a procedure substantially that described in Example 8, the glyoxalation step was carried out over a period of fifteen minutes, with addition of reactants at about fifty degrees centigrade and then, while stirring, allowing the temperature to drop to about 25 degrees centigrade; the bromination step was carried out in the same manner as before; the subsequent reaction with sodium methoxide was carried out over a period of three hours and the resulting reaction mixture, instead of being mixed with water as it was in Example 8, was mixed directly with the zinc and acetic acid and stirred for a period of thirty minutes, using eighty milliliters of glacial acetic acid per 0.1 mole of starting 11-ketoprogesterone. The resulting reaction product was poured into about 1500 milliliters of water, washed and dried, to give 3,11-diketo-4,17(20)-pregnadiene-21-oic acid methyl ester, melting at 172 to 194 degrees centigrade, in a yield of 89 percent of that theoretically obtainable from the starting 11-ketoprogesterone. A chromatographic purification of these crystals over 150 grams of Florisil magnesium silicate developed with 200-milliliter portions of solvents of the following order and composition: one of benzene, five of Skellysolve B hexane hydrocarbons plus five percent acetone, five of Skellysolve B plus 7.5 percent acetone, ten of Skellysolve B plus ten percent acetone, and two of Skellysolve B plus fifteen percent acetone, gave 63 percent yield of the amount theoretically obtainable from 11-ketoprogesterone. The 3 - 11-diketo-4,17(20)-pregnadiene-21-oic acid methyl ester predominantly was eluted in the Skellysolve B plus ten percent acetone eluates and melted at about 205 to 209 degrees centigrade after the removal of the eluting solvent.

*Example 10.*—*3,11-diketo-4,17(20)-pregnadiene-21-oic acid methyl ester*

Following the procedure described in Example 8, but replacing the tertiary butyl alcohol with benzene and eliminating the isolation of the product before the reaction with zinc and acetic acid, a reaction mixture is obtained, which, after filtering, washing with water, drying, and then removing the solvent therefrom, consists essentially of 3,11-diketo-4,17(20)-pregnadiene-21-oic acid methyl ester.

In a similar manner to that described in Examples 8 through 10, other $\Delta^{4,17(20)}$-3-keto-21-oic acid methyl ester steroids are prepared by substituting the selected starting $\Delta^4$-3-keto steroid, having at the 17 position a hydrogen atom and an acetyl group and having two hydrogen atoms at position 2 of the steroid nucleus, e. g., 11α-hydroxyprogesterone, 11β - hydroxyprogesterone, progesterone, 9(11) - oxidoprogesterone, 6,11α-dihydroxyprogesterone, 11-keto-12-bromoprogesterone, 12-ketoprogesterone, 9-dehydroprogesterone, 10-normethyl, 13-normethyl and 10, 13-dinormethyl analogues of these and other pregnane series steroids, and stereo and spacial isomers of pregnane series steroids, or the like, for the 11-ketoprogesterone used therein. Other steroids meeting the above requirements and having other groups located in the steroid nucleus, such as alkoxy, acyloxy, hydroxy, keto, unsaturation, oxides, and other non-interfering groups, may also be used if desired.

Other alkyl homologue esters of any of the above-named $\Delta^{4,17(20)}$-3-keto-21-oic acid methyl ester steroids are prepared by substituting the appropriate alkali-metal base and alkanol in Step III for the sodium methoxide in methanol used therein, e. g., sodium ethoxide in ethanol if the ethyl ester is desired, sodium propoxide in propanol to produce the propyl ester, sodium methoxide in tertiary butyl alcohol to produce the methyl ester, and so on.

The following reactions illustrate a method whereby 3-keto-4,17(20)-pregnadiene-21-oic acid alkyl esters can be converted into cortical hormones or cortical hormone-like compounds.

3-ETHYLENE GLYCOL KETAL OF 3,11-DIKETO-4,17(20)-PREGNADIENE-21-OIC ACID METHYL ESTER

To a solution of 1.5 grams (0.0042 mole) of 3,11-diketo-4,17(20)-pregnadiene-21-oic acid methyl ester dissolved in 150 milliliters of benzene was added 7.5 milliliters of ethylene glycol and 0.150 gram of para-toluenesulfonic acid and the whole was then heated with stirring at the reflux temperature of the reaction mixture for 5.5 hours. The cooled reaction mixture was washed with 100 milliliters of a one percent aqueous sodium bicarbonate solution. The benzene layer was then poured on a column of 150 grams of Florisil synthetic magnesium silicate. The column was developed with 100-milliliter portions of solvents of the following composition and order: eight portions of methylene chloride and three portions of methylene chloride plus four percent acetone. The methylene chloride eluates contained 1.08 grams of the 3-ethylene glycol ketal of 3,11-diketo-4,17(20)-pregnadiene-21-oic acid methyl ester, which upon recrystallization from a mixture of ethyl acetate and Skellysolve B hexane hydrocarbons melted at 188 to 190 degrees centigrade and had the analysis given below. The methylene chloride plus four percent acetone eluates contained 0.390 gram of pure starting 3,11-diketo-4,17(20)-pregnadiene-21-oic acid methyl ester. The yield of product was 87 percent of the theoretical calculated on the amount of starting steroid which reacted.

*Analysis.*—Calculated for $C_{24}H_{32}O_5$: C, 71.94; H, 8.05. Found: C, 71.90; H, 7.95.

3-ETHYLENE GLYCOL KETAL OF 11β,21-DIHYDROXY-4,17(20)-PREGNADIENE-3-ONE

A solution of 1.50 grams of the 3-ethylene glycol ketal of 3,11-diketo-4,17(20)-pregnadiene-21-oic acid methyl ester in seventy milliliters of benzene was added dropwise to a stirred mixture of 1.50 grams of lithium aluminum hydride and fifty milliliters of anhydrous ether. When addition was complete, the reaction mixture was refluxed for one-half hour whereafter the mixture was cooled to room temperature. Fifty milliliters of water was then cautiously added to the stirred reaction mixture to decompose the excess lithium aluminum hydride, followed by 200 milliliters of methylene chloride. The whole was then centrifuged to facilitate separation of the organic and aqueous phases. The organic phase was separated, the solvent distilled and the white crystalline distillation residue was crystallized from a mixture of ethyl acetate and Skellysolve B hexane hydrocarbons to yield 1.003 grams, a yield of 72 percent of the theoretical, of crystalline 3-ethylene glycol ketal of 11β,21-dihydroxy-4,17(20)-pregnadiene-3-one in two crops. The first crop, the analysis of which is given below, melted at 191 to 194 degrees centrigrade and the second, at 172 to 180 degrees centigrade.

*Analysis.*—Calculated for $C_{23}H_{34}O_4$: C, 73.76; H, 9.15. Found: C, 73.87; H, 9.22.

11β,21-DIHYDROXY-4,17(20)-PREGNADIENE-3-ONE

A solution of 0.572 gram (0.0015 mole) of the 3-ethylene glycol ketal of 11β,21-dihydroxy-4,17(20)-pregnadiene-3-one in forty milliliters of acetone was diluted with water to a volme of fifty milliliters and eight drops of concentrated sulfuric acid was then added thereto, whereafter the reaction mixture was kept at room temperature for 24 hours. The reaction mixture was then made alkaline by the addition of a saturated aqueous sodium bicarbonate solution and the acetone was then evaporated from the mixture. Methylene chloride and more water were then added, the methylene chloride layer removed, and the solvent distilled therefrom. The residue, after drying in vacuo, consisted of the theoretical 0.518 gram of 11β,21-dihydroxy-4,17(20)-pregnadiene-3-one which upon crystallization from ethyl acetate melts at 155 to 157 degrees centigrade.

11β-HYDROXY-21-ACETOXY-4,17(20)-PREGNADIENE-3-ONE

A solution of 0.518 gram of 11β,21-dihydroxy-4,17(20)-pregnadiene-3-one in five milliliters of pyridine was mixed with two milliliters of acetic anhydride and the whole was then maintained at room temperature for seventeen hours whereafter crushed ice was added thereto. The precipitated 11β - hydroxy - 21-acetoxy-4,17(20)-pregnadiene-3-one was filtered therefrom, dissolved in benzene and then chromatographed over a column of 75 grams in Florisil synthetic magnesium silicate. The column was developed with 75-milliliter portions of solvents of the following composition and order: benzene, three portions each of Skellysolve B hexane hydrocarbons plus one percent acetone, Skellysolve B plus five percent acetone, Skellysolve B plus ten percent acetone, Skellysolve B plus fifteen percent acetone, Skellysolve B plus twenty percent acetone, and finally, two portions of acetone. The eluate fractions containing ten percent and fifteen percent acetone, respectively, were combined, the solvent removed therefrom, and the crystalline residue was crystallized from a mixture of ethyl acetate and Skellysolve B to yield as the first crop 0.253 gram, a yield of 45 precent of the theoretical, of 11β - hydroxy - 21 - acetoxy - 4,17(20) - pregnadiene - 3 - one melting at 183 to 186 degrees centrigrade.

*Analysis.*—Calculated for $C_{23}H_{32}O_4$: C, 74.16; H, 8.66. Found: C, 74.18; C, 73.95; H, 8.45; H, 8.74.

11β,17α,21-TRIHYDROXY-4-PREGNENE-3-ONE (KENDALL'S COMPOUND F)

To a stirred suspension of 0.124 gram (0.00033 mole) of 11β - hydroxy - 21 - acetoxy - 4,17(20) - pregnadiene - 3-one in two milliliters of tertiary butyl alcohol was added 0.26 milliliter of a 2.6 molar solution of hydrogen peroxide in tertiary butyl alcohol and 0.30 milliliter of a solution of 1.00 gram of osmium tetroxide in 100 milliliters of tertiary butyl alcohol. An additional 0.50 milliliter of the above-described osmium tetroxide solution was added to the reaction mixture during the next thirty hours. After the first four hours of reaction time the reaction mixture darkened and became homogeneous. The reaction mixture was stirred and maintained at room temperature for an additional 84 hours, whereafter water and methylene chloride were added thereto. The whole was distilled at reduced pressure to remove the organic solvents and the product was extracted from the residue with methylene chloride, whereafter the extract was freed of solvent by evaporation. The residue, after dissolving in a mixture of five milliliters of methanol and one milliliter of a solution of 0.30 gram of sodium sulfite in five milliliters of water, was heated on a steam bath for thirty minutes. The 11β,17α,21 - trihydroxy - 4 - pregnene -

3,20-dione was separated therefrom by extraction with methylene chloride, which was thereafter removed by distillation in vacuo. The 0.101 gram of residue consisted of about fifty percent of the desired 11β,17α,21-trihydroxy - 4 - pregnene - 3,20 - dione (Kendall's Compound F).

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. A process which includes the steps of (1) mixing a $\Delta^4$-3-keto compound having an androstane carbon skeleton and having at the 17 position a hydrogen atom and an acetyl group, and having two hydrogen atoms at the 2 position of the steroid nucleus, with at least about two molar equivalents each of an alkali-metal base condensing agent and an alkyl diester of oxalic acid to produce a steroid condensation product which includes a $\Delta^4$ - 3,20 - diketo - 2,21 - dialkoxyoxalyl alkali-metal dienolate compound of the pregnane series; and (2) reacting the thus-produced steroid condensation product with at least about two molar equivalents of a halogen having an atomic weight from 35 to 80, but not substantially exceeding that amount required to maintain free halogen in the reaction mixture, to produce a halogenation product which includes a $\Delta^4$ - 3,20 - diketo - 2,21,21 - trihalo - 2,21 - dialkoxyoxalyl compound of the pregnane series; and (3) reacting the thus-produced steroid halogenation product with at least two molar equivalents each of an alkanol and a base to produce a steroid reaction product which includes a $\Delta^{4,17(20)}$-2-halo-3-keto-21-oic acid alkyl ester compound of the pregnane series; and (4) reacting the thus-produced 2-halogenated steroid acid ester with a dehalogenating agent to produce a $\Delta^{4,17(20)}$-3-keto-21-oic acid alkyl ester compound of the pregnane series.

2. A process which includes the steps of (1) mixing a $\Delta^4$-3-keto compound having an androstane carbon skeleton and having at the 17 position a hydrogen atom and an acetyl group, and having two hydrogen atoms at the 2 position of the steroid nucleus, with more than about one molar equivalent each of an alkali-metal base condensing agent and an alkyl diester of oxalic acid, to produce a steroid condensation product which includes a $\Delta^4$ - 3,20 - diketo - 2,21 - dialkoxyoxalyl alkali-metal dienolate compound of the pregnane series; and (2) reacting the thus-produced steroid condensation product with at least about two molar equivalents of a halogen having an atomic weight from 35 to 80, but not substantially exceeding that amount required to maintain free halogen in the reaction mixture, to produce a steroid halogenation product which includes a $\Delta^4$ - 3,20 - diketo - 2,21,21 - trihalo - 2,21 - dialkoxyoxalyl compound of the pregnane series; and (3) reacting the thus-produced steroid halogenation product with at least two molar equivalents each of an alkanol and an alkali-metal base, to produce a steroid reaction product which includes a $\Delta^{4,17(20)}$ - 2 - halo - 3 - keto - 21 - oic acid alkyl ester compound of the pregnane series; and (4) reacting the thus-produced 2-halogenated steroid acid ester with a dehalogenating agent to produce a $\Delta^{4,17(20)}$-3-keto-21-oic acid alkyl ester compound of the pregnane series.

3. The process of claim 2 wherein the alkali-metal base in both occurrences is an alkali-metal alkoxide and the halogen is bromine.

4. The process of claim 2 wherein the alkali-metal base in both occurrences is an alkal-metal alkoxide, the halogen is bromine, and the starting $\Delta^4$-3-keto steroid is a progesterone.

5. The process of claim 2 wherein the alkali-metal base in both occurrences is an alkali-metal alkoxide, the halogen is bromine, and the starting $\Delta^4$-3-keto steroid is selected from the group consisting of 11α-hyroxyprogesterone, 11β-hydroxyprogesterone and 11-ketoprogesterone.

6. The process of claim 2 wherein the alkali-metal base in both occurrences is an alkali-metal alkoxide, the halogen is bromine, and the starting $\Delta^4$-3-keto steroid is 11-ketoprogesterone.

7. The process of claim 2 wherein the alkali-metal base in both occurrences is an alkali-metal alkoxide, the halogen is bromine, and the starting $\Delta^4$-3-keto steroid is 11α-hydroxyprogesterone.

8. The process of claim 2 wherein the alkali-metal base in both occurrences is an alkali-metal alkoxide, the halogen is bromine, and the starting $\Delta^4$-3-keto steroid is 11β-hydroxyprogesterone.

9. A process which includes the steps of (1) reacting, in the presence of an organic solvent, a $\Delta^4$-3-keto compound having an androstane carbon skeleton and having at the 17 position a hydrogen atom and an acetyl group, and having two hydrogen atoms at the 2 position of the steroid nucleus, with more than about one molar equivalent each of an alkali-metal base condensing agent and an alkyl diester of oxalic acid, to produce a steroid condensation product which includes a $\Delta^4$-3,20-diketo-2,21-dialkoxyoxalyl alkali-metal dienolate compound of the pregnane series; and (2) adding to the resulting reaction mixture at least about two moles of a halogen having an atomic weight from 35 to 80, per mole of original starting $\Delta^4$-3,20-diketo steroid, but not substantially exceeding that amount required to maintain free halogen in the reaction mixture, to produce a steroid halogenation product which includes a $\Delta^4$-3,20-diketo-2,21,21-trihalo-2,21-dialkoxyoxalyl compound of the pregnane series; and (3) adding to the resulting reaction mixture, in the presence of at least two molar equivalents of an alkanol, at least about two molar equivalents of an alkali-metal base, to produce a steroid reaction product which includes a $\Delta^{4,17(20)}$-2-halo-3-keto-21-oic acid alkyl ester compound of the pregnane series; and (4) adding a dehalogenating agent to the reaction mixture to produce a $\Delta^{4,17(20)}$-3-keto-21-oic acid alkyl ester compound of the pregnane series.

10. A process which includes the steps of (1) reacting, in the presence of an organic solvent, a $\Delta^4$-3-keto compound having an androstane carbon skeleton and having at the 17 position a hydrogen atom and an acetyl group, and having two hydrogen atoms at the 2 position of the steroid nucleus, with at least two molar equivalents each of an alkali-metal base condensing agent and an alkyl diester of oxalic acid, to produce a $\Delta^4$-3,20-diketo-2,21-dialkoxyoxalyl alkali-metal dienolate compound of the pregnane series; and (2) adding to the resulting reaction mixture about three moles of a halogen having an atomic weight from 35 to 80, per mole of original starting $\Delta^4$-3,20-diketo steroid, but not substantially exceeding that amount required to maintain free halogen in the reaction mixture, to produce a $\Delta^4$-3,20-diketo-2,21,21-trihalo-2,21-dialkoxyoxalyl compound of the pregnane series; and (3) adding to the resulting reaction mixture, in the presence of more than two molar equivalents of an alkanol, more than two molar equivalents of an alkali-metal base, to produce a $\Delta^{4,17(20)}$-2-halo-3-keto-21-oic acid alkyl ester compound of the pregnane series; and (4) adding a dehalogenating agent to the reaction mixture to produce a $\Delta^{4,17(20)}$-3-keto-21-oic acid alkyl ester compound of the pregnane series.

11. A process which includes the steps of (1) reacting, in the presence of an organic solvent, a $\Delta^4$-3-keto compound having an androstane carbon skeleton and having at the 17 position a hydrogen atom and an acetyl group, and having two hydrogen atoms at the 2 position of the steroid nucleus, with more than about one molar equivalent each of an alkali-metal base condensing agent and an alkyl diester of oxalic acid, to produce a steroid condensation product which includes a $\Delta^4$-3,20-diketo-2,21- dialkoxyoxalyl alkali-metal dienolate compound of the pregnane series; and (2) adding to the resulting mixture an aliphatic carboxylic acid in an amount at least sufficient to react with any alkali-metal base condensing agent remaining in the reaction mixture, and a sufficient number of molar equivalents of an alkali-metal salt of an aliphatic carboxylic acid to total at least one when added to the number of molar equivalents of aliphatic carboxylic acid theoretically required to decompose any excess alkali-metal base condensing agent remaining in the reaction mixture, followed by bromine in an amount of about but not substantially exceeding that amount required to maintain free bromine in the reaction mixture, to produce a steroid bromination product which includes a $\Delta^4$-3,20-diketo-2,21,21-tribromo-2,21-dialkoxyoxalyl compound of the pregnane series; and (3) adding to the resulting mixture, in the presence of at least two molar equivalents of an alkanol, at least about two molar equivalents of an alkali-metal base plus a sufficient amount to react with all of the aliphatic carboxylic acid present in the reaction mixture, to produce a steroid reaction product which includes a $\Delta^{4,17(20)}$-2-bromo-3-keto-21-oic acid alkyl ester compound of the pregnane series; and (4) adding zinc and acetic acid to the resulting mixture to produce a $\Delta^{4,17(20)}$-3-keto-21-oic acid alkyl ester compound of the pregnane series.

12. The process of claim 11 wherein the number of molar equivalents each of zinc and acetic acid employed is greater than the number of molar equivalents exceeding two of bromine employed.

13. The process of claim 11 wherein the alkali-metal base in both occurrences is an alkali-metal alkoxide.

14. The process of claim 11 wherein the starting $\Delta^4$-3,20-diketo steroid is a progesterone and wherein the alkali-metal base in both occurrences is an alkali-metal alkoxide.

15. The process of claim 11 wherein the starting $\Delta^4$-3,20-diketo steroid is selected from the group consisting of 11α-hydroxyprogesterone, 11β-hydroxyprogesterone and 11-ketoprogesterone and wherein the alkali-metal base in both occurrences is an alkali-metal alkoxide.

16. The process of claim 11 wherein the starting $\Delta^4$-3,20-diketo steroid is 11-ketoprogesterone and wherein the alkali-metal base in both occurrences is an alkali-metal alkoxide.

17. The process of claim 11 wherein the starting $\Delta^4$-3,20-diketo steroid is 11α-hydroxyprogesterone and wherein the alkali-metal base in both occurrences is an alkali-metal alkoxide.

18. The process of claim 11 wherein the starting $\Delta^4$-3,20-diketo steroid is 11β-hydroxyprogesterone and wherein the alkali-metal base in both occurrences is an alkali-metal alkoxide.

19. A process which includes the steps of (1) reacting, in the presence of an organic solvent, a $\Delta^4$-3-keto compound having an androstane carbon skelton and having at the 17 position a hydrogen atom and an acetyl group, and having two hydrogen atoms at the 2 position of the steroid nucleus, with more than about one molar equivalent each of an alkali-metal alkoxide and an alkyl diester of oxalic acid to produce a steroid condensation product which includes a $\Delta^4$-3,20-diketo-2,21-dialkoxyoxalyl alkali-metal dienolate compound of the pregnane series; and (2) adding to the resulting mixture acetic acid in an amount at least sufficient to react with any alkali-metal alkoxide remaining in the reaction mixture, and a sufficient number of molar equivalents of an alkali-metal salt of acetic acid to total at least one when added to the number of molar equivalents of acetic acid theoretically required to decompose any alkali-metal alkoxide remaining in the reaction mixture, followed by bromine in an amount of about but not substantially exceeding that amount required to maintain free bromine in the reaction mixture, to produce a steroid bromination product which includes a $\Delta^4$-3,20-diketo-2,21,21-tribromo-2,21-dialkoxyoxalyl compound of the pregnane series; and (3) adding to the resulting mixture, in the presence of at least two molar equivalents of methanol, at least about two molar equivalents of sodium methoxide plus a sufficient amount to react with all of the acetic acid present in the reaction mixture, to produce a steroid reaction product which includes a $\Delta^{4,17(20)}$-2-bromo-3-keto-21-oic acid methyl ester compound of the pregnane series; and (4) adding to the resulting mixture a number of molar equivalents each of zinc and acetic acid at least equal to the number of molar equivalents exceeding two of bromine employed, to produce a $\Delta^{4,17(20)}$-3-keto-21-oic acid methyl ester compound of the pregnane series.

20. The process of claim 19 wherein the starting steroid is a progesterone.

21. The process of claim 20 wherein the starting steroid is selected from the group consisting of 11α-hydroxyprogesterone, 11β-hydroxyprogesterone and 11-ketoprogesterone.

22. The process of claim 19 wherein the starting steroid is 11-ketoprogesterone.

23. The process of claim 19 wherein the starting steroid is 11α-hydroxyprogesterone.

24. The process of claim 19 wherein the starting steroid is 11β-hydroxyprogesterone.

25. A process which includes the steps of (1) reacting, in the presence of an organic solvent, 11-ketoprogestrone with at least about two molar equivalents each of sodium methoxide and diethyl oxalate, to produce a steroid condensation product which includes 2,21-diethoxyoxalyl-11-ketoprogesterone sodium dienolate; and (2) adding to the resulting mixture acetic acid in an amount at least sufficient to react with any sodium methoxide remaining in the reaction mixture, and a sufficient number of molar equivalents of sodium acetate to total at least one when added to the number of molar equivalents of acetic acid theoretically required to decompose any sodium methoxide remaining in the reaction mixture, followed by bromine in an amount of about but not substantially exceeding that amount required to maintain free bromine in the reaction mixture, to produce a steroid bromination product which includes 2,21,21-tribromo-2,21-diethoxyoxalyl-11-ketoprogesterone; and (3) adding to the resulting mixture, in the presence of at least about two molar equivalents of methanol, at least about two molar equivalents of sodium methoxide plus a sufficient amount to react with all of the acetic acid present in the reaction mixture, to produce a steroid reaction product which includes 2-bromo-3,11-diketo-4,17(20)-pregnadiene-21-oic acid methyl ester; and (4) adding to the resulting mixture a number of molar equivalents each of zinc and acetic acid at least equal to the number of molar equivalents exceeding two of bromine employed, to produce 3,11-diketo-4,17(20)-pregnadiene-21-oic acid methyl ester.

26. The process of claim 25 wherein the reaction solvent is tertiary butyl alcohol.

27. A process which includes the steps of (1) reacting, in the presence of an organic solvent, 11-ketoprogesterone with more than two molar equivalents each of sodium methoxide and diethyl oxalate, to produce 2,21-diethoxyoxalyl - 11 - ketoprogesterone sodium dienolate; and (2) adding to the resulting mixture acetic acid in an amount sufficient to react with all of the base present in the reaction mixture, and a sufficient number of molar equivalents of sodium acetate to total at least one when added to the number of molar equivalents of acetic acid theoretically required to decompose any sodium methoxide remaining in the reaction mixture, followed by bromine in an amount of about but not substantially exceeding that amount required to maintain free bromine in the reaction mixture, to produce 2,21,21 - tribromo - 2,21-diethoxyoxalyl-11-ketoprogesterone; and (3) adding to the resulting mixture, in the presence of more than two molar equivalents of methanol, more than two molar equivalents of sodium methoxide plus a sufficient amount to react with all of the acetic acid present in the reaction mixture, to produce 2-bromo-3,11-diketo-4,17(20)-pregnadiene-21-oic acid methyl ester; and (4) adding to the resulting mixture more than a mole each of zinc and acetic acid per mole of starting 11-ketoprogesterone, to produce 3,11-diketo-4,17(20)-pregnadiene-21-oic acid methyl ester.

References Cited in the file of this patent

UNITED STATES PATENTS 2,683,724    Hogg _____ July 13, 1954